Sept. 5, 1961           C. E. ADAMS           2,998,869

POWER OPERATED BRAKE OPERATING APPARATUS

Filed March 10, 1959           2 Sheets-Sheet 1

INVENTOR.
CECIL E. ADAMS
BY

Sept. 5, 1961  C. E. ADAMS  2,998,869
POWER OPERATED BRAKE OPERATING APPARATUS
Filed March 10, 1959  2 Sheets-Sheet 2

INVENTOR.
CECIL E. ADAMS
BY

United States Patent Office 2,998,869
Patented Sept. 5, 1961

2,998,869
POWER OPERATED BRAKE OPERATING
APPARATUS
Cecil E. Adams, Columbus, Ohio, assignor to American Brake Shoe Company, New York, N.Y., a corporation of Delaware
Filed Mar. 10, 1959, Ser. No. 798,440
2 Claims. (Cl. 188—152)

This invention relates to hydraulic brake operating apparatus and one of its objects is to provide an improved apparatus which is particularly adapted for use in brake systems which are operated, for example, by a powered system, such as an air pressure or vacuum system, and which powered system may be under the control of a person, such brake systems being exemplified by the brake systems of railroad cars and trains.

In carrying out the foregoing object, it is a further object of the invention to provide an improved power operated hydraulic brake operating apparatus which requires a minimum of maintenance and servicing over prolonged periods of usage and which includes precautionary means for preventing failure of the brake system of which it forms a part.

Another object of the invention is to provide an improved power operated brake operating apparatus which normally transmits brake applying forces by means of hydraulic pressure and which in the event of failure of such pressure will operate mechanically to transmit brake applying forces.

Another object of the invention is to provide an improved hydraulic master cylinder which acts at times as a simple piston and cylinder fluid displacing apparatus and at other times as a differential piston and cylinder fluid displacing apparatus and in which fluid under pressure in the cylinder thereof is positively prevented from leaking to the fluid reservoir when the apparatus is functioning as differential piston and cylinder by a pair of valves which are connected in series, and one of which valves is of a positive sealing type and is preferably a poppet valve.

Another object of the invention is to provide an improved hydraulic master cylinder which operates as a simple piston and cylinder fluid displacing apparatus to bring the friction brake elements of the brake system of which it forms a part into engagement quickly with a small amount of movement of its externally operated brake force applying means, and which, after said friction elements are brought into engagement, changes its mode of operation to that of a differential piston and cylinder thereby changing its fluid displacement ratio to apply braking force to the friction elements of the system.

Another object of the invention is to provide an improved hydraulic master cylinder as set forth in the foregoing object in which provision is made to insure that the master cylinder will not change its displacement ratio due to surges in pressure of the brake operating system.

It is still another object of the invention to provide a hydraulic master cylinder of the differential piston type referred to in the foregoing object with improved pressure responsive valve means which operates in response to a predetermined hydraulic pressure developed by the piston thereof for applying brake force and which valve mechanism operates at a controlled rate to establish communication between the opposite ends of the differential piston and to close the fluid flow path between the cylinder and reservoir and which then operates at a greater rate of speed to establish fully open communication between the opposite ends of said piston and positively seals the flow path between said cylinder and reservoir.

A still further object of the invention is to provide an improved hydraulic brake operating apparatus the valving means of which may be formed entirely of metal parts and which, therefore, are not subject to deterioration solely by reason of their age.

Further objects and advantages of the present invention will be apparent from the following description, reference being had to the accompanying drawings wherein a preferred form of embodiment of the invention is clearly shown.

Figure 1:
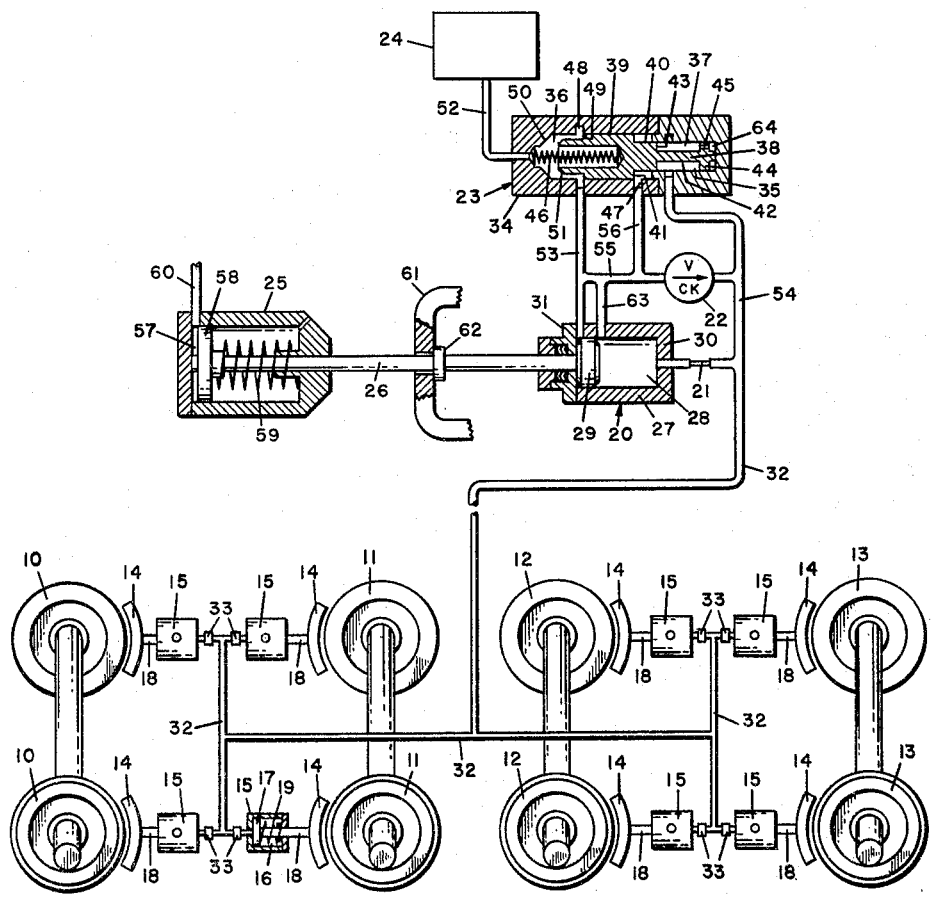
FIG. 1 is a diagrammatic view illustrating the invention as a hydraulic brake operating mechanism for a railroad car, the apparatus being shown in its normal, released or inoperative condition.

FIG. 1 of the drawings illustrates a hydraulic brake system which may be used with particular advantage on railroad cars, or other vehicles which, like railroad cars, are usually connected toegther and moved as a train and wherein there is a power system which operates the hydraulic system. The system illustrated includes four pairs of track engaging wheels 10, 11, 12 and 13. In practice each pair of these wheels is mounted upon a common axle and the axles and wheels are divided equally between two trucks, not shown, which cary the body of the railroad car. Each of the mentioned trucks carries four friction brake shoes 14 which are adapted to be pressed against the rims of the wheels by hydraulic motors 15 which motors are also carried by the truck.

The hydraulic motors 15 are of the piston and cylinder type and each includes a cylinder 16, a piston 17, a piston rod 18 which is operated by the piston 17 to move a brake shoe 14 and a spring 19 which surrounds the piston rod and engages the piston 17 and one end of the cylinder 16 to urge the brake shoe to its released position, i.e., away from the rim of its adjacent wheel.

The hydraulic brake system also includes a master cylinder which is comprised of a piston and cylinder assembly 20, a restrictor 21, a check valve 22, and a fluid pressure operated control valve 23. In practice the elements 20 through 23 may be contained within a single body, but for the sake of simplicity they are herein shown as being separate structures interconnected by conduits.

The brake system also includes a reservoir 24 from which hydraulic brake fluid is supplied to the hydraulic system and an air operated operating piston and cylinder 25 by which the master cylinder is operated through a piston rod 26 to apply and release the brakes.

The piston and cylinder assembly 20 includes a body or housing 27 which forms a cylinder 28 in which there is a piston 29 which may be formed integrally with the piston rod 26. The cylinder 28 is closed at one end by a wall 30 and its other end is closed by a cap 31 which includes a packing gland through which the piston rod 26 is reciprocated to move the piston 29. The end of the cylinder 28 adjacent the wall 30 is connected through the restrictor 21 to a branched conduit 32 which is connected through fuse type valves 33 to the eight brake shoe operating motors 15.

The fuse type valves 33 are provided solely as a safety measure and each operates only if a hydraulic leak should occur in that motor 15 which receives hydraulic fluid through it to isolate that motor from the system so that the remainder of the system will remain operative. Valves of the this type are well known in the art and for this reason the valves 32 will not be described further herein.

The control valve assembly 23 includes a body 34 formed of two elements which cooperate to provide a stepped bore 35 having a large diameter portion 36 and a small diameter portion 37 in which there is a shuttle 38. The shuttle 38 also includes a large diameter portion 39 and a small diameter portion 40 which sealingly slidingly engage the large and small diameter portions 36 and 37, respectively, of the bore 35 and which are separated by a shoulder 41. The small diameter end of the shuttle is grooved at 42 to provide a shoulder 43 and a land 44 which also sealingly slidably engages the small diameter portion 37 of the bore 35. Land 44 is provided with a small orifice 45, the function of which is important and which will be described in detail hereinafter. The large diameter end of the shuttle is provided with a central axial bore which receives a spring 46 which is seated in the end of the valve body 34 at the large diameter end of the bore 33 and this spring urges the shuttle 38 to the position shown in FIG. 1 of the drawings.

The body 34 and shuttle 38 cooperate to form three valves, one (37, 43) between the end of the small diameter portion 37 of the bore 35 where it joins the large diameter portion 36 and the shoulder 43 on shuttle 38, a second (48, 49) between a port 48 and a shoulder 49 on the large diameter end of the shuttle 38 and the third (50, 51) by a tapered seat 50 and the tapered end 51 of the shuttle 38.

The tank or reservoir 24 is connected with the rear, piston rod or small displacement area side of the piston 29 and cylinder 28 by the valves 50, 51 and 48, 49 which are interposed in series relation in a fluid passageway comprised of a conduit 52 between the reservoir 24 and valve 23, the large diameter portion 36 of bore 35 and a conduit 53 connected between the valve 23 and the cylinder 28. The large displacement area side of the piston 29 and cylinder 28 is connected to the interior of the small diameter portion 37 of bore 35 and to the valve 37, 43 through a conduit 54 and the restrictor 21, and the conduits 53 and 54 are connected together by a conduit 55 in which the check valve 22 is interposed. A conduit 56 connects the port 47 with the conduit 55 and the small displacement area side of the piston 29 and cylinder 28.

The power operated piston and cylinder 25 includes a body which forms a closed cylinder 57 in which there is a piston 58 that is attached to the operating or piston rod 26, a spring 59 surrounds the rod 26 and abuts one side of the piston 58 and one end of the cylinder 57 to urge the piston 58, the rod 26 and the piston 29 to the position seen in FIG. 1 of the drawings in which the brake system is inoperative and the brakes are released. A conduit 60 is connected to the cylinder 57 and air under pressure is admitted through this conduit 60 to the cylinder 57 from an accumulator, or pressure chamber, not shown, which is carried by the railroad car of which the brake system forms a part.

It may be mentioned here that in the brake system of a railroad train each car is provided with one of the mentioned accumulators and these accumulators are pressurized from a pump on the locomotive of the train and the accumulators are valved in such manner that when the engineer of the train reduces the air pressure in the system the accumulators are caused to direct air under pressure to a brake operating means such as the piston and cylinder assembly 25 described herein to apply the brakes on each car and consequently to the entire train. It may also be mentioned that each railroad car is provided with a manually operated means by which a brakeman riding the car may apply the brakes. This means usually comprises a hand operated winch mechanism, not shown, which is connected to move a yoke 61 that is carried by the rod 26 and is drawn against a collar 62 thereon to apply the brakes independently of the accumulator.

In the operation of the system herein disclosed, when the engineer reduces the air pressure in the air or power operated portion of the brake system of the train, air under pressure from the mentioned accumulator is directed into the cylinder 57 to cause the piston 58, the rod 26 and piston 29 to move to the right from the positions in which they are shown in FIG. 1 of the drawings. Movement of the piston 29 to the right closes a compensating conduit or passageway 63, which is shown as being interposed between the large displacement area side of the piston 29 and the conduit 55, and the piston 29 then displaces fluid from the large displacement area side of the piston 29 and cylinder 28 through the restrictor 21 to the conduits 32 and 54. At this time conduit 54 is blocked by the valve 37, 43 and check valve 22 and the fluid passes through the conduit 32 and the fuse valves 33 to the motors 15 which move the brake shoes 14 into engagement with the rims of the wheels 10—13.

It will be seen that the brake shoes will be moved rapidly into engagement with the wheels by a short stroke of the piston rod 26 and piston 29 since at this time the master cylinder is functioning as a simple fluid displacing apparatus and all of the fluid displaced from the large displacement area side of the piston 29 and cylinder 28 is directed to the motors 15 and the small displacement area side of the piston 29 and cylinder 28 is supplied with fluid from the reservoir 24 since they are in direct communication therewith through the conduits 52, 53 and valves 48, 49 and 50, 51.

After the brake shoes engage the wheels, the pressure at the large displacement area side of piston 29 will, of course, increase and this pressure will be applied through the conduit 54 to the small diameter end area of the shuttle 38 by passing through the orifice 45 in the land 44 thereof. As this pressure increases the shuttle 38 will be moved to the left overcoming the force of the spring 46 and opening the valve 37, 43 and closing the valve 48, 51 which valve prevents the flow of fluid from the system to the reservoir 24 and vice versa. The relation of the valves is preferably such that valve 48, 49 will have just closed when the valve 37, 43 cracks open and upon the cracking open of valve 37, 43 the area of the land or shoulder 41 on the large diameter portion of the shuttle will also become exposed to the pressure existing in the conduit 54. When the land 41 becomes exposed to the pressure existing in conduit 54 the shuttle 38 will be moved more rapidly, as by a snap action, to the position shown in FIG. 2 of the drawings to close the poppet type valve 50, 51 which positively seals the system from the reservoir 24.

At the time valve 37, 43 opens, the operation of the piston 29 and cylinder 28 changes from that of a simple fluid displacement type to a differential displacement type and this occurs because when valve 37, 43 is opened and valves 48, 49 and 50, 51 are closed, some fluid displaced from the large displacement area side of piston 29 is directed to the small displacement area side thereof through the restrictor 21, conduit 54, valve 37, 43, and conduits 56, 55 and 53. When fluid is directed from the large to the small displacement area side of the piston in the manner described the volume of fluid displaced from the large displacement side of the piston which is effective for doing work is determined by the cross-sectional area of the piston rod 26.

From the description thus far given it will be seen that the friction elements, i.e., the brake shoes 14 and the rims of the wheels 10-13 will be brought into engagement quickly by a relatively short stroke of the piston 58, piston rod 26 and piston 29 and that after they become engaged the master cylinder will, in response to a build up to a predetermined pressure at the large displacement area end of its piston 29, change its mode of operation from that of a simple relatively large volumetric displacement device to that of a differential piston device having a smaller volumetric displacement and that the smaller volume displaced will then be employed to exert the brake applying force to the brake shoes.

Figure 2:
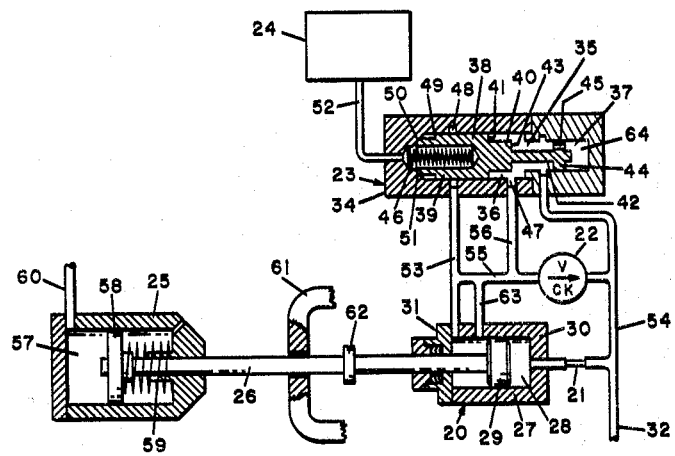
FIG. 2 is a view showing a part of the apparatus seen in FIG. 1 in the positions which they occupy when the brakes of the railroad cars are applied.

When the brakes are to be released slowly the air is exhausted slowly from the cylinder 57 and spring 59 urges the piston 58, piston rod 26 and piston 29 to the left from the position seen in FIG. 2 of the drawings to the position seen in FIG. 1 thus reducing the hydraulic pressure at the large displacemnt area side of the piston 29 which, of course, permits the shuttle 38 to move from the position seen in FIG. 2 to the position seen in FIG. 1 to close the valve 37, 43 to sever the communication between the large and small displacement area sides of the piston 29 and to open the valves 48, 49 and 50, 51 to re-establish communication between said small displacement area and the reservoir 24. If the piston 29 moves at a slow rate the fluid displaced back to the large displacement area side of it by the brake motors 15 will maintain the cylinder 28 at that side of said area full of liquid and after the piston 29 opens the compensating conduit 63 the hydraulic system will be opened to the reservoir 24.

When the brakes are released suddenly (by exhausting the air from the cylinder 57 quickly), the spring 59 may cause the piston 29 to be moved to the left from the position seen in FIG. 2 at a rate such that the brake motors 15 can not maintain the cylinder 28 at the large displacement area side of the piston 29 filled with fluid. Under this condition fluid may be drawn from the reservoir through the check valve 22 to supply the deficiency and after the piston 29 opens the compensating passage 63 any excess fluid then contained within the brake motors 15 will be returned to the reservoir 24.

The above described apparatus includes, among others, two features which make it particularly useful in connection with brake systems which are operated by a power system the latter of which may be under the control of a person, for example, the engineer of a railroad train, and these features reside in the restrictor 21 and the control valve 23 and their functions of preventing surges in pressure in the system from causing the master cylinder to change its mode of operation prematurely from that of a simple displacement piston and cylinder to that of a differential displacement piston and cylinder.

In brake systems of the type referred to it frequently occurs that the power system which operates the hydraulic system is actuated quickly and in the absence of the precautionary features above referred to the surge in pressure at the large displacement area side of the piston 29 could be reflected to the valve 23 to cause the shuttle 38 thereof to shift and change the mode of operation of the master cylinder from the simple piston and cylinder displacement type to the differential piston and cylinder displacement type before the brake shoes are brought into engagement with the rims of the wheels. Such action is, of course, highly undesirable and it is prevented in the apparatus described by the restrictor 21 and features of the control valve 23 including its orifice 45 which will be described hereinafter.

In the present system, the speed at which the piston 29 can displace fluid from the cylinder 28 is limited by the restrictor 21, however, if the force applied to move the piston is sufficient, the piston 29 could create a pressure at its large displacement area side sufficient to force fluid through the orifice 21 into the conduit 54 at such a rate as to create a surge in pressure therein and the valve 23 is constructed to prevent such a surge from shifting its shuttle 38.

Referring again to the control valve 23, it will be seen that fluid is admitted to the small diameter portion 37 of the bore 35 thereof and to the groove 42 of the shuttle 38 from the conduit 54. It will also be seen that the pressure of the fluid within the groove 42 will not cause the shuttle to move to overcome the spring 46, but that it is the pressure of the fluid which passes through the orifice 45 in the land 44 to a chamber 64 at the end of the shuttle 38 that moves the shuttle and that the diameter or effective area of the orifice 45 will determine the rate or rates of speed at which the shuttle can and will be moved within the bore 35. Thus, a pressure surge within the cylinder 28 at the large displacement area side thereof or in the conduit 54 will effect the movement of the shuttle 38 only under the control of the resistor 21 and orifice 45, or the orifice 45 alone if the restrictor 21 is omitted, as it may be.

It will thus be seen that the construction of the valve 23 is such that it has a time delay function, that is, it will permit momentary surges in pressure to be created in the conduit 54 for the purpose of overcoming breakaway friction of any of the brake shoe operating motors 15 of the system and that it requires a sustained pressure in the conduit 54 to cause shifting of the valve 23. This action of the valve occurs because the orifice 45 functions as a fluid flow control, choke or restrictor to limit the rate at which fluid can enter the chamber 64 to move the shuttle 38 to that position at which it cracks the valve 37, 43.

Figure 3:
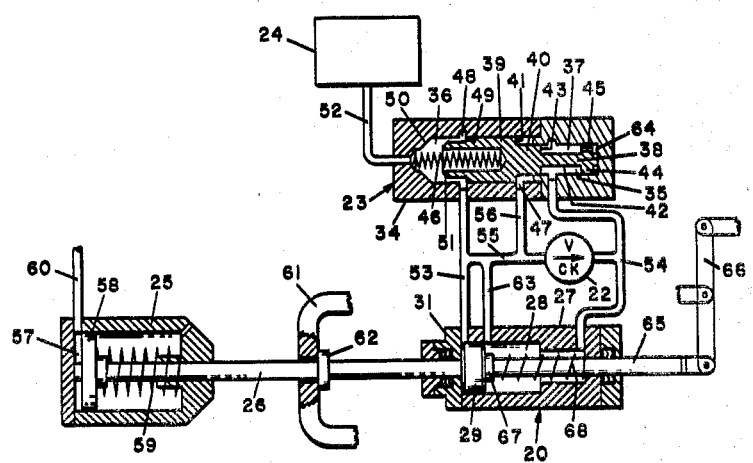
FIG. 3 is a diagrammatic view of a different brake operating mechanism which embodies the invention in a different form.

FIG. 3 of the drawings illustrates the invention in a modified form in which provision is made whereby should a failure of the hydraulic portion of the system occur the brakes will function mechanically. This apparatus is adapted to be incorporated into the brake system of a railroad car between its air power operated system and the mechanical levers and linkages which are operated by it.

The master cylinder seen in FIG. 3 differs from that of FIG. 2 only in the construction of its main cylinder assembly and the fact that the restrictor 21 is omitted. For this reason the elements of this apparatus which correspond with those of FIG. 1 carry the same numerals and the operation of the hydraulic system is the same except for the differences now to be pointed out.

In the embodiment of FIG. 3 the master cylinder does not displace brake fluid to individual brake motors but instead displaces fluid which causes movement of a piston 65, which is connected to operate the usual mechanical brake linkage 66 of the railroad car. As indicated in the drawing, the piston 65 extends through a packing gland on the end of the cylinder and its inner end is provided with a head 67 that abuts the main piston when the brakes are released. This piston 65 is urged toward the main piston by a spring 68.

In the operation of this device, when the main piston is moved to the right it abuts and moves the piston 65 mechanically until the compensating conduit 63 becomes covered by the main piston at which time the main piston begins to apply pressure to the fluid at its large displacement area side. This pressure on the fluid causes it to move the small diameter piston 65 rapidly thereby causing the mechanical brake linkage 66 to bring the brake shoes quickly into engagement with the wheels with a short stroke of the main piston. After the brake shoes have been brought into contact with the wheels the pressure at the large displacement area side of the main piston will, of course, continue to increase to operate the control valve 23 and the operation of the master cylinder will then be as previously described in connection with the embodiment seen in FIG. 1 of the drawings.

It will be seen that should a failure occur in the hydraulic system in this embodiment of the invention that the main piston will operate the piston 65 to apply the brakes.

From the foregoing description it is obvious that by this invention there have been provided power operated hydraulic brake operating apparatuses which are compatable with the brake systems presently employed on railroad cars and that any car employing the invention may be placed in a train among other cars which do not include it.

It will also be seen that a railroad car brake system including my invention has the advantage over existing air operated brake systems in that it will operate upon smaller volumes of air and this is because the master cylinder first functions as a motion multiplier and requires only a small amount of movement of the air motor piston which operates it to bring the brake shoes into engagement with the wheels.

It will be obvious that because the brake shoes are moved initially through a greater distance or stroke with a relatively short travel of the piston of the air operating motor and the piston of the master cylinder that the brake shoes can be worn from their new condition to their worn out condition without requiring that the brake systems be serviced to adjust the slack in its linkage to maintain the brake shoes close to but out of engagement with the wheels.

While the form of embodiment of the present invention as herein disclosed constitutes a preferred form, it is to be understood that other forms might be adopted, all coming within the scope of the claims which follow.

I claim:

1. In a hydraulic brake master cylinder, a cylinder; a piston in said cylinder having a large and a small displacement area, one on each side thereof; externally operated means for moving said piston to create brake operating fluid pressure at the large displacement area side thereof; a fluid reservoir; valve means including a slide valve and a poppet valve connected in series and normally establishing communication between said small displacement area side of said piston and said reservoir and a slide valve normally preventing communication between the opposite sides of said piston, said valve means operating in response to a predetermined brake operating fluid pressure at the large displacement area side of said piston and including two areas adapted to be acted upon in succession by said fluid pressure for operating said valve means, one of said areas being effective to open said valve which normally prevents communication between the opposite sides of said piston, to close the slide valve between said piston and reservoir and to expose the other of said valve areas to said pressure, and means operative to control the rate at which said fluid pressure may be applied to said one valve area, said other valve area being effective to change the rate at which said valve means operates to close said poppet valve.

2. In a hydraulic brake master cylinder, a cylinder; a piston in said cylinder having a large and a small displacement area, one on each side thereof; externally operated means for moving said piston to create brake operating fluid pressure at one side thereof; a fluid reservoir; valve means including a slide valve and a poppet valve connected in series and normally establishing communication between the other side of said piston and said reservoir and a slide valve normally preventing communication between the opposite sides of said piston, said valve means operating in response to a predetermined brake operating fluid pressure at said one side of said piston and including two areas adapted to be acted upon in succession by said fluid pressure for operating said valve means, one of said areas being effective to open said valve which normally prevents communication between the opposite sides of said piston, to close the slide valve between said piston and reservoir and to expose the other of said valve areas to said pressure, and means operative to control the rate at which said fluid pressure may be applied to said one valve area, said other valve area being effective to change the rate at which said valve means operates to close said poppet valve.

References Cited in the file of this patent

UNITED STATES PATENTS

| | | |
|---|---|---|
| 2,065,168 | Brown | Dec. 22, 1936 |
| 2,161,279 | Bowen | June 6, 1939 |
| 2,317,473 | Miller | Apr. 27, 1943 |
| 2,328,683 | Schnell | Sept. 7, 1943 |